(12) United States Patent
Fujimoto et al.

(10) Patent No.: US 7,110,607 B2
(45) Date of Patent: Sep. 19, 2006

(54) IMAGE PROCESSING APPARATUS

(75) Inventors: Katsuhito Fujimoto, Kawasaki (JP); Atsuko Ohara, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 09/994,792

(22) Filed: Nov. 28, 2001

(65) Prior Publication Data
US 2002/0131646 A1     Sep. 19, 2002

(30) Foreign Application Priority Data
Mar. 14, 2001   (JP)   .............................. 2001-071869

(51) Int. Cl.
G06K 9/36     (2006.01)

(52) U.S. Cl. ...................... 382/237; 382/203; 382/229; 358/3; 358/3.11

(58) Field of Classification Search ................ 382/112, 382/113, 135, 137, 165, 237, 252, 274, 275, 382/202, 203, 229; 358/3.26, 3.27, 518, 358/463, 464, 3, 3.01, 3.11; 348/586, 607, 348/614, 615
See application file for complete search history.

(56) References Cited

U.S. PATENT DOCUMENTS

| | | | | |
|---|---|---|---|---|
| 4,907,288 A | * | 3/1990 | Shimoni | ..................... 382/130 |
| 5,054,101 A | | 10/1991 | Prakash | |
| 5,680,479 A | * | 10/1997 | Wang et al. | ................. 382/176 |
| 5,701,500 A | * | 12/1997 | Ikeo et al. | ................... 715/517 |
| 5,848,184 A | * | 12/1998 | Taylor et al. | ................ 382/173 |
| 5,889,885 A | | 3/1999 | Moed et al. | |
| 5,915,037 A | | 6/1999 | Weber et al. | |
| 6,081,325 A | * | 6/2000 | Leslie et al. | ............. 356/237.2 |
| 6,301,386 B1 | * | 10/2001 | Zhu et al. | .................... 382/176 |
| 6,438,265 B1 | * | 8/2002 | Heilper et al. | ............... 382/172 |
| 6,577,762 B1 | * | 6/2003 | Seeger et al. | ............... 382/173 |
| 6,738,517 B1 | * | 5/2004 | Loce et al. | .................. 382/209 |

FOREIGN PATENT DOCUMENTS

| | | |
|---|---|---|
| CN | 1144587 A | 3/1997 |
| WO | 00/77718 A1 | 12/2000 |

OTHER PUBLICATIONS

Due et al, Evaluation of Binarization Mehtods for Document Images, Mar. 1995, IEEE, vol. 17, No. 3.*
Øivind Due Trier, et al., "Goal-Directed Evaluation of Binarization Methods", IEEE Transactions on Pattern Analysis and Machine Intelligence, vol. 17, No. 12, pp. 1191-1201.

* cited by examiner

Primary Examiner—Samir A. Ahmed
Assistant Examiner—Yosef Kassa
(74) Attorney, Agent, or Firm—Staas & Halsey LLP

(57) ABSTRACT

A multilevel image into which a color or a black-and-white image is converted is input, and a slightly indistinct binary image generating unit generates a slightly indistinct binary image that includes a slightly indistinct line pattern and does not include background noise. Additionally, a shape-preserved binary image generating unit generates a binary image that preserves the shape of a line pattern and includes background noise. These images are ANDed for each pixel, so that a binary image that preserves the shape of the line pattern and does not include the background noise is generated.

9 Claims, 36 Drawing Sheets

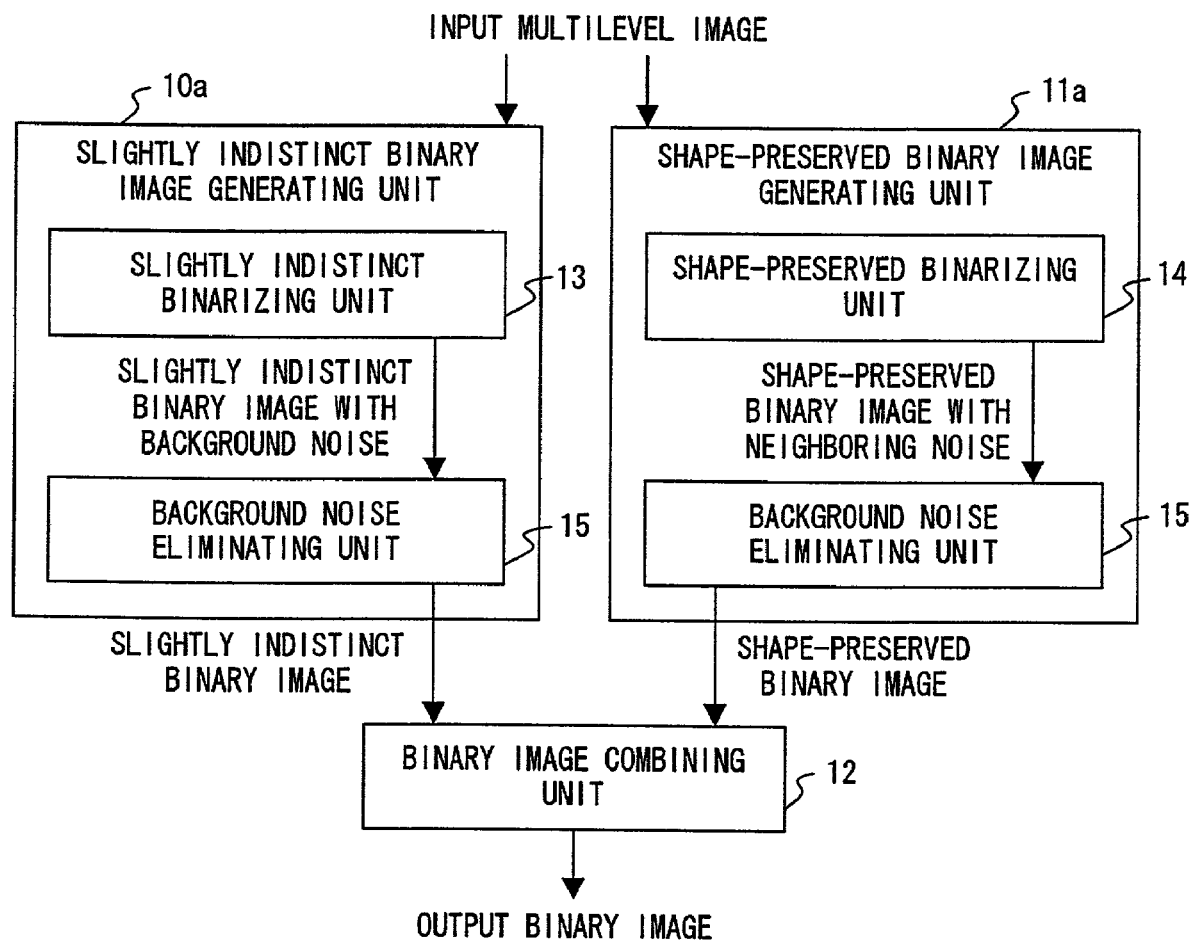
F I G. 1 9

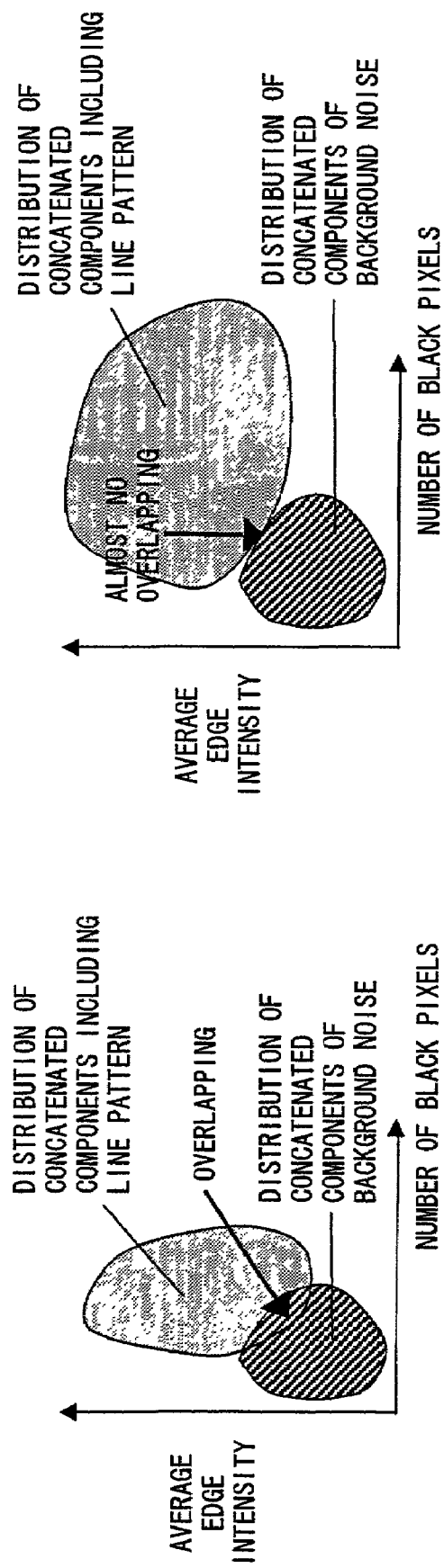

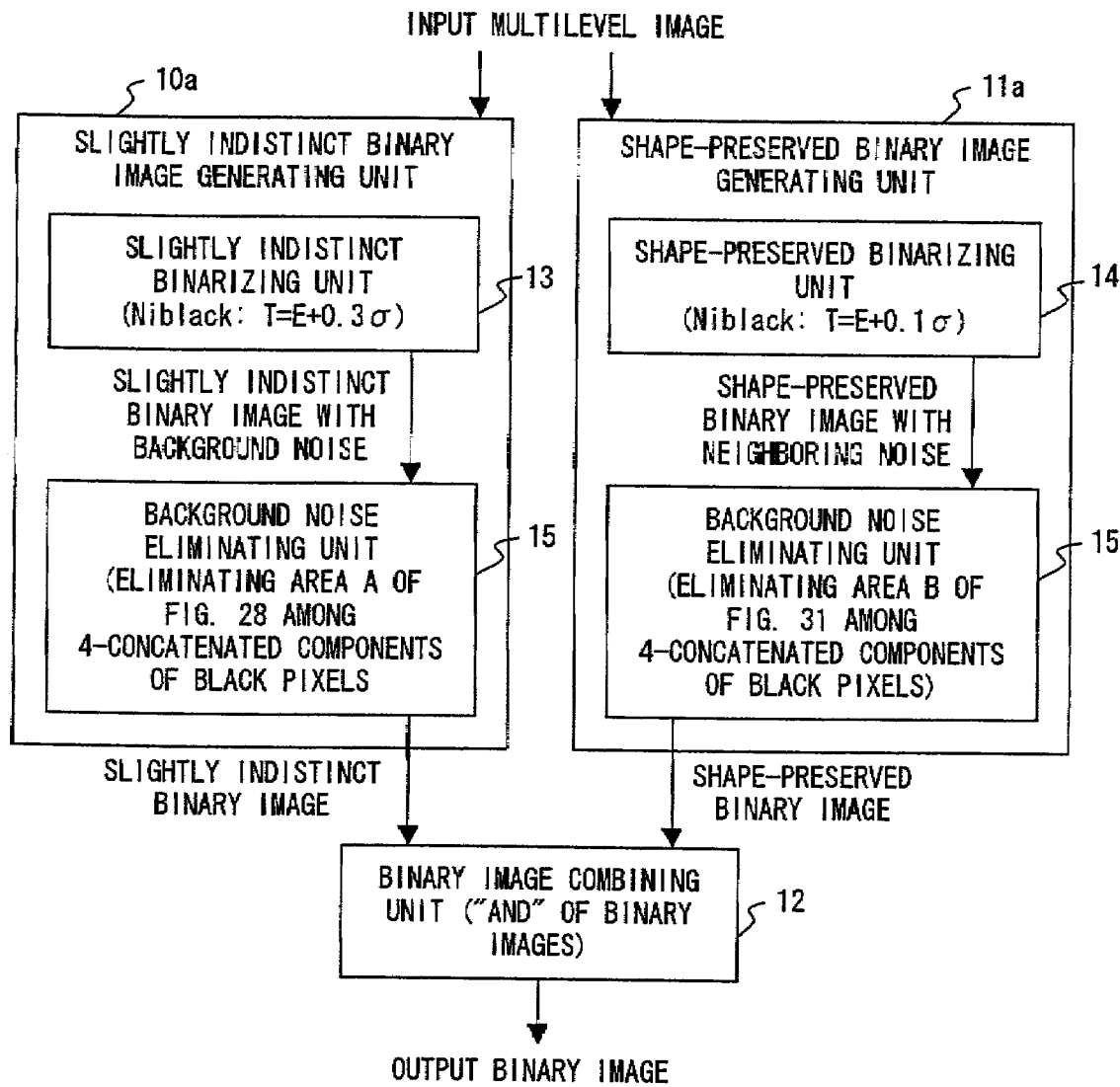
F I G. 2 6

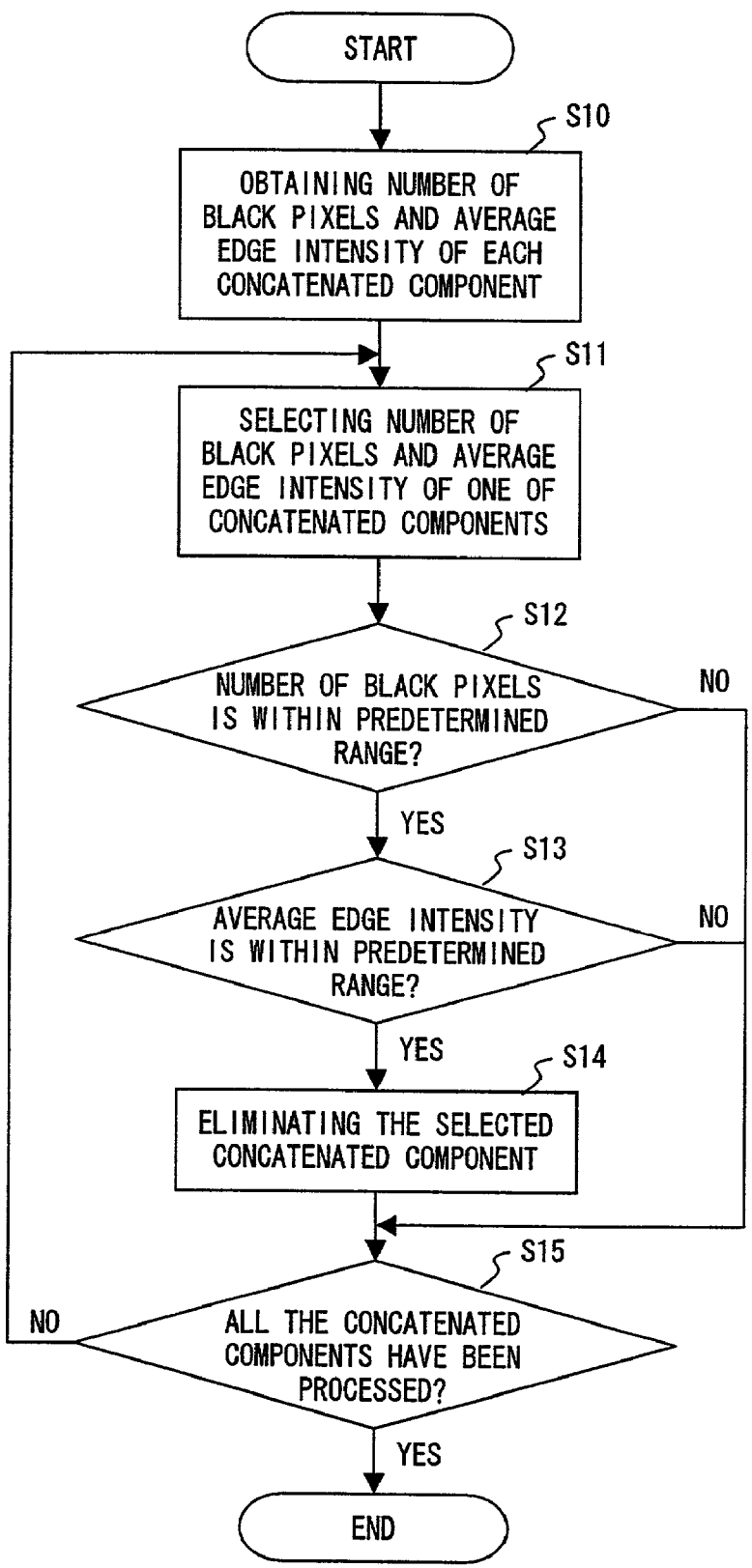
F I G. 34

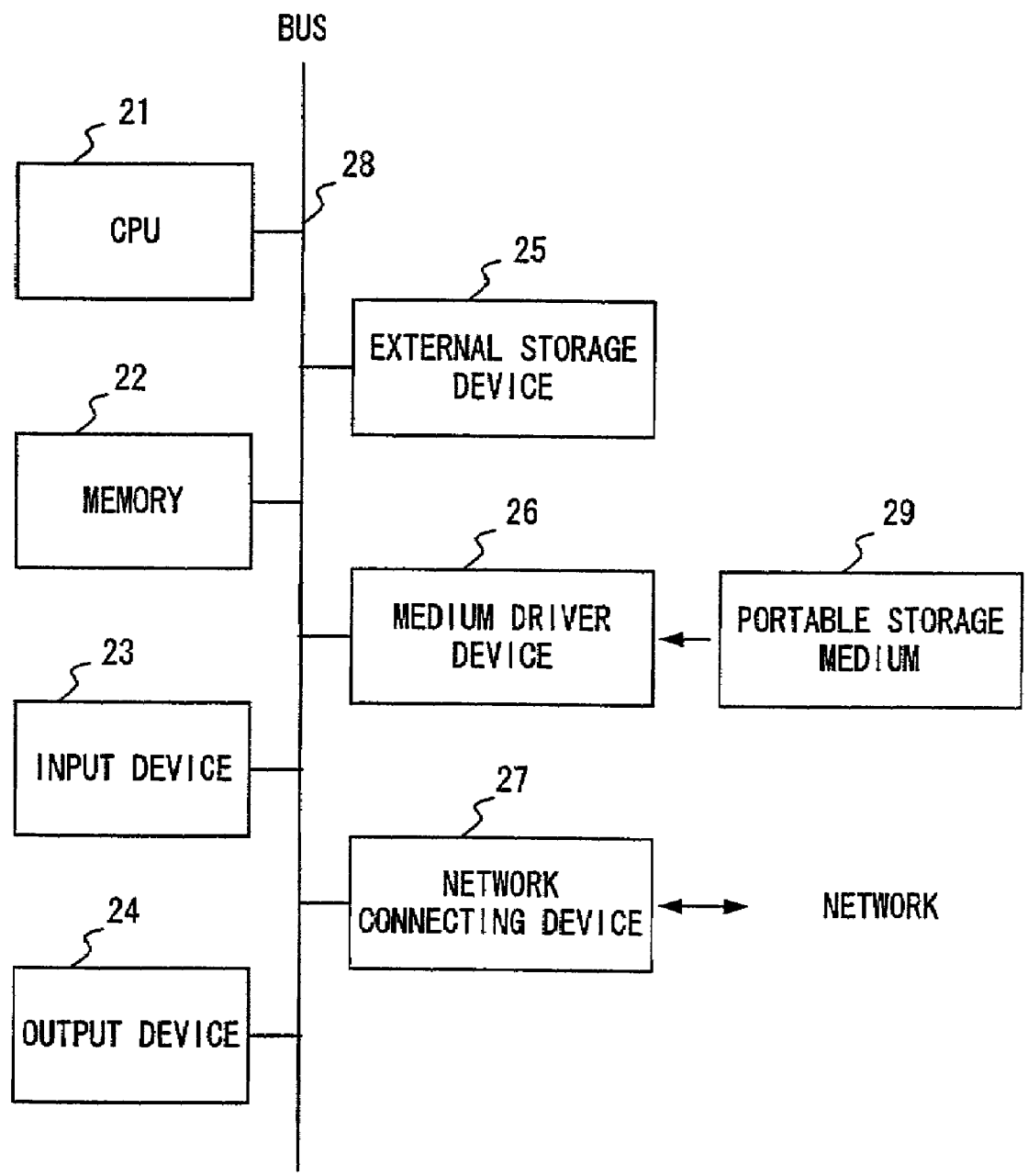
F I G. 3 5

IMAGE PROCESSING APPARATUS

BACKGROUND OF THE INVENTION

1. Field of the Invention

The present invention relates to an image processing apparatus.

2. Description of the Related Art

In recent years, paper form and document recognition techniques using a non-contact type image input device (OHR: Over Head Reader) have received widespread attention.

FIG. 1 shows the external view of an OHR.

The non-contact type image input device (OHR) is an image input device of a standing type shown in FIG. 1, which uses a line or an area CCD as an image pickup device. Using the OHR allows a user to feel comfortable in operations such as an operation for filling in a paper form or a document while inputting an image, an operation for inputting an image while looking at a paper form or a document, etc., in comparison with a contact type image input device such as a conventional image scanner.

However, an image captured by an OHR (OHR image) suffers degradation in image quality, such as density unevenness, a shadow, image deformation, etc., in comparison with an image captured by a scanner (scanner image).

FIG. 2 shows the state of a grayscale (graylevel?) scanner image, whereas FIG. 3 shows the state of a grayscale OHR image. It is known from the OHR image shown in FIG. 3 that the degree of density unevenness is slightly high and character lines are more blurred although no shadow exists.

FIG. 4 shows the state of an OHR image with a shadow. As shown in this figure, the OHR image has a shadow. Therefore, a binarization technique that overcomes density unevenness, a shadow, etc. is essential to use an OHR.

To enable a recognition process with high accuracy for an OHR image, a binarization method for obtaining a stable line pattern is required for a shadow/density unevenness. Binarization using a predetermined threshold is insufficient, and local binarization such as Niblack binarization, etc. must be introduced. For Niblack local binarization, refer to the following document.

φ. D. Trier, A. K. Jain: "Goal-Directed Evaluation of Binarization Methods," IEEE Transactions on Pattern Analysis and Machine Intelligence, Vol. 17. NO. 12, pp. 1191–1201, 1995

Niblack local binarization is a method performing binarization for each pixel by defining that a threshold value of each pixel is $T=E+k\sigma$ (E and $\sigma$ are respectively a density average and a standard deviation in the neighborhood of a target pixel, and k is a constant of approximately −0.4 to 0.4). A square area of N×N pixels, which centers on a target pixel, is used in the neighborhood of the target pixel (N=7 or so is frequently used).

Furthermore, if Niblack local binarization is applied unchanged, spotted black-and-white noise occurs in a background area due to the phenomenon that all of pixels in the neighborhood of a target pixel have uniform density. FIG. 5 exemplifies an OHR image, whereas FIG. 6 shows a binary image that is obtained by performing Niblack local binarization for the OHR image shown in FIG. 5.

As is known from FIG. 6, spotted black-and-white noise occurs in a background area (in case of N=7, and k=0.1).

Therefore, the spotted black-and-white background noise is eliminated by determining a 4-concatenated component with an average edge intensity of outline pixels, which is equal to or smaller than a predetermined value, of a 4-concatenated component of black pixels of a binary image to be the background noise, and by removing the concatenated component. The 4-concatenated component of black pixels is a maximum set of black pixels, which is obtained by sequentially concatenating black pixels adjacent left and right and up and down. Also there is an 8-concatenated component containing the 4-concatenated component. This is a maximum set of black pixels, which is obtained by sequentially concatenating black pixels adjacent in four diagonal directions containing left and right and up and down. Here, also the 8-concatenated component may be used. If a simple term "concatenated component" appears hereinafter, it indicates a 4- or 8-concatenated component. The outline pixels of a concatenated component is black pixels included in the concatenated component, and a white pixel being background exists in any of up and down or left and right of each of the black pixels. The average edge intensity of outline pixels is an average of the edge intensities of the outline pixels. The edge intensity of an outline pixel is an edge intensity obtained with a Sobel edge filter, etc.

FIGS. 7A and 7B explain the concept of Niblack local binarization.

As shown in FIG. 7A, for example, a square area of 7×7 pixels centering on each of pixels of a grayscale image obtained from a color or a black-and-white image is recognized to be a process target. Assume that an average of the densities of black pixels within the square area is E, and a standard deviation from the average E of the densities of the pixels within the square area is $\sigma$. A threshold value T for determining whether a pixel to be binarized is either black or white is obtained by an equation $T=E+k\sigma$. Also assume that the density of the pixel to be binarized is g. This pixel is made black if $g \leq T$, and made white if $g>T$. According to such determination results, binary images are sequentially obtained by providing black or white data after being binarized as the density data of the target pixel (FIG. 7B).

FIG. 8 is a flowchart showing the flow of the Niblack local binarization process. Firstly, in step S1, a pixel to be processed is selected. In step S2, densities of pixels within a square area centering on the selected pixel are obtained. In step S3, an average E of the densities of the pixels within the square area, and a standard deviation $\sigma$ are calculated. In step S4, a threshold value T is obtained with the equation $T=E+k\sigma$ (k is typically a value between −0.4 and 0.4). Then, in step S5, it is determined whether or not the density of the selected pixel is equal to or larger than the threshold value T. If the result of the determination made in step S5 is "YES", the selected pixel is made black. If the result of the determination made in step S5 is "NO", the selected pixel is made white. In step S8, it is determined whether or not all pixels of the image to be binarized have been processed. If a pixel yet to be processed is left, the process goes back to step S1 and the subsequent operations are repeated. If it is determined that all the pixels have been processed, the process is terminated.

FIG. 9 explains a Sobel edge filter and edge intensity.

If a concatenated component shown in (1) of FIG. 9 exists, a shaded portion corresponds to outline pixels. For the outline pixels, a square area of 3×3 pixels, which is shown in (4) and centers on a pixel to be processed, is taken, and the densities of pixels within the square area and filters shown in (2) and (3) of FIG. 9 are multiplied and added. Suppose that a vector component generated by the filter in (2) is $S_x$, and a vector component generated by the filter in (3) is $S_y$. In this case, a vector $S=(S_x, S_y)$ is obtained for the central pixel of the square area as shown in (4). The length of this vector, namely, $\sqrt{(S_x^2+S_y^2)}$ is the Sobel edge intensity of the target pixel.

The average edge intensity is an intensity acquired by obtaining such edge intensities for all of the outline pixels of the concatenated component in (1), and by averaging the obtained edge intensities.

FIG. 10 shows a result of eliminating background noise by removing 4-concatenated components whose average edge intensities are equal to or smaller than 4.

As described above, a binary image of relatively high quality can be obtained with a conventional technique from an image having relatively good contrast shown in FIG. 5.

The background noise elimination used by conventional techniques stably and properly operates for a character having good contrast, but not for an image having poor contrast between a background and a character, that is, an image including an extremely faint character as shown in FIG. 11.

A result of executing Niblack local binarization (k=0.1) for the grayscale image of FIG. 11 is shown in FIG. 12.

If the background noise elimination is executed with the average edge intensity of 4 or smaller in a similar manner as in the case of FIG. 10, also the extremely faint character string is removed together although the background noise can be eliminated.

If the average edge intensity at the time of background noise elimination is set to 2 or smaller so as to preserve the line patterns of the extremely faint character string, this results in a binary image from which the background noise cannot be eliminated completely.

As described above, the conventional techniques using the background noise elimination that adopts the local binarization and an average edge intensity have a problem in that an extremely faint character string cannot be satisfactorily extracted without including background noise.

SUMMARY OF THE INVENTION

An object of the present invention is to provide an image processing apparatus that appropriately detects a line pattern from an input image having poor contrast, and performs a binarization process.

An image processing apparatus according to the present invention is an image processing apparatus, to which an image including a line pattern such as a character, a ruled line, a graphic, etc. is input, outputs a corresponding binary image. This apparatus comprises: a slightly indistinct binary image generating unit generating a first image that includes almost an entire line pattern although its shape is indistinct; a shape-preserved binary image generating unit generating a second image that includes almost the entire line pattern and also noise in a background area other than the neighborhood of the line pattern; and an image combining unit combining the first and the second images for each pixel, and generating a satisfactory binary image which includes almost the entire line pattern while preserving its shape and does not include the noise in the background area.

The present invention can provide an image processing apparatus that can securely capture the shape of a line pattern by combining images having different natures (the first and the second images. Particularly, these images are binary images) for each pixel (particularly, AND combination for each pixel) while eliminating noise in a background area. With the conventional techniques, a line pattern becomes slightly indistinct if attempts are made to securely capture its shape, or spotted black-and-white noise occurs in a background area if attempts are made to make the shape of a line pattern distinct. Here, particularly, the first image is a binary image where the shape of a line pattern is slightly indistinct, whereas the second image is a binary image where the shape of the line pattern is not indistinct, but spotted black-and-white noise occurs in a background area.

According to one preferred embodiment of the present invention, the first and the second images are combined after background areas of the first and the second images are detected, and a background noise elimination process is performed. As a result, the image obtained by combining the images becomes superior in quality.

According to a further preferred embodiment of the present invention, postprocessing is performed for a result of combining the first and the second images, thereby improving the quality of a final image.

BRIEF DESCRIPTION OF THE DRAWINGS

FIG. 16 shows a slightly indistinct binary image obtained from the grayscale image that is shown in FIG. 11 and includes the extremely faint character string;

FIG. 18 shows a combined binary image obtained by ANDing the slightly indistinct binary image and the shape-preserved binary image for each pixel;

FIG. 19 exemplifies a second configuration of an image processing apparatus according to a preferred embodiment of the present invention;

FIG. 23 shows a shape-preserved binary image obtained from the grayscale image that is shown in FIG. 11 and includes the extremely faint character string;

FIG. 24 shows a combined binary image obtained by ANDing the slightly indistinct binary image and the shape-preserved binary image for each pixel;

FIGS. 25A and 25B are graphs representing the number of black pixels against an average edge intensity of a line pattern;

FIG. 26 exemplifies a more specific example of the preferred embodiment according to the present invention;

FIG. 29 shows a slightly indistinct binary image obtained from the grayscale image that is shown in FIG. 11 and includes the extremely faint character string;

FIG. 32 shows a shape-preserved binary image obtained from the grayscale image that is shown in FIG. 11 and includes the extremely faint character string;

FIG. 33 shows a combined binary image obtained by ANDing the slightly indistinct binary image and the shape-preserved binary image for each pixel;

FIG. 34 is a flowchart showing a background noise elimination process;

FIG. 35 shows the configuration of an information processing device required when the preferred embodiments of the present invention is implemented by a program;

DESCRIPTION OF THE PREFERRED EMBODIMENTS

According to preferred embodiments of the present invention, a slightly indistinct binary image that includes almost an entire pattern although its shape is indistinct, and a shape-preserved binary image that includes the line pattern while preserving its shape and also includes background noise other than the neighborhood of the line pattern are generated by using a nature such that a distribution of the number of black pixels to an average edge intensity of concatenated components (a distribution of concatenated components when a graph is plotted by taking the number of black pixels and an average edge intensity of a concatenated component as axes) of a line pattern, and that of concatenated components of background noise overlap regarding a binary image that preserves the shape of a line pattern such as a character, a ruled line, a graphic, etc. and is resultant from local binarization, whereas these distributions are separate regarding a binary image whose line pattern is slightly made indistinct and which is resultant from local binarization, and these binary images are ANDed, so that a satisfactory image that includes almost the entire line pattern while preserving its shape and does not include the noise in the background area is generated.

Figure 15:
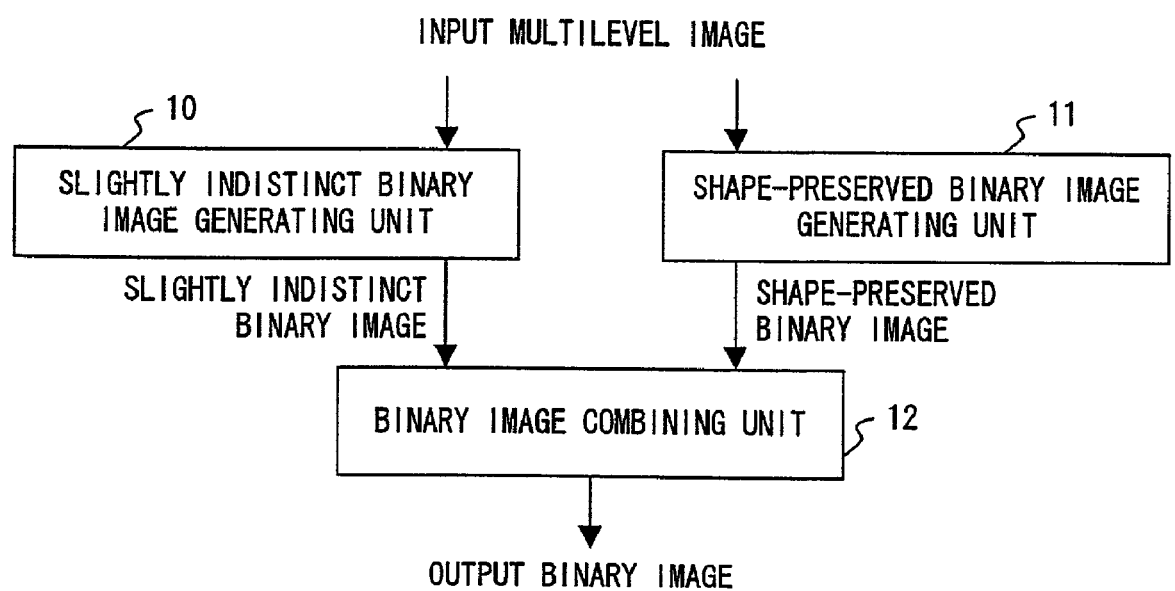
FIG. 15 exemplifies a first configuration of an image processing apparatus according to a preferred embodiment of the present invention.

FIG. 15 exemplifies a first configuration of an image processing apparatus according to a preferred embodiment of the present invention.

The image processing apparatus having this exemplified configuration, to which a monochrome multilevel image (including an image into which a color image is converted) that includes a line pattern such as a character, a ruled line, a graphic, etc. is input, comprises a slightly indistinct binary image generating unit 10, a shape-preserved binary image generating unit 11, and a binary image combining unit 12. When a binary image obtained by extracting a line pattern as black pixels is output, the slightly indistinct binary image generating unit 10 generates a slightly indistinct binary image that includes almost the entire line pattern although its shape is indistinct, and does not include noise in a background area, the shape-preserved binary image generating unit 11 generates a shape-preserved binary image that includes almost the entire line pattern while preserving its shape, and also includes noise in a background area other than the neighborhood of the line pattern, and the binary image combining unit 12 combines the slightly indistinct binary image and the shape-preserved binary image. As a result, a satisfactory binary image that includes almost the entire line pattern while preserving its shape and does not include the noise in the background is generated and output.

Figure 1:
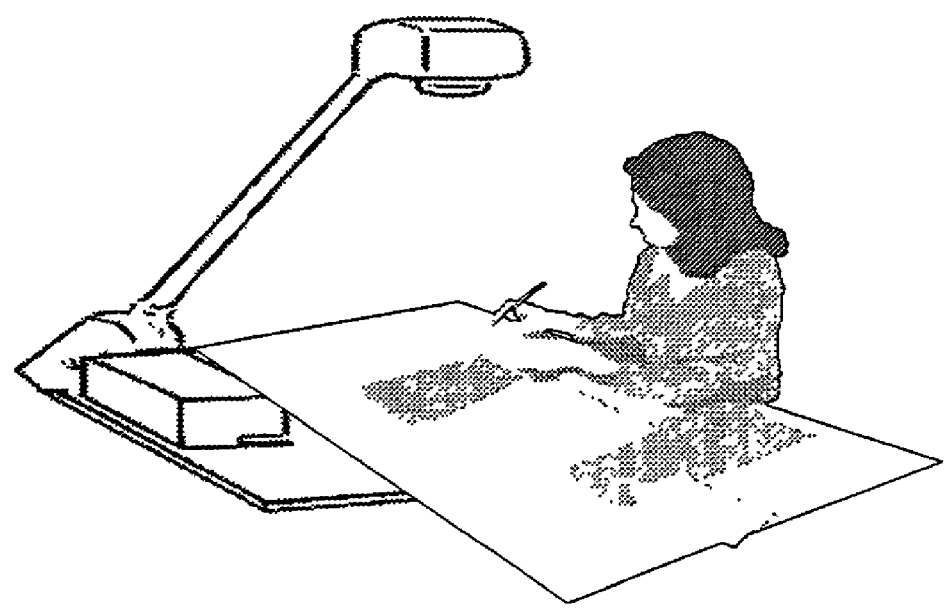
FIG. 1 is an external view of an OHR.
Figure 2:
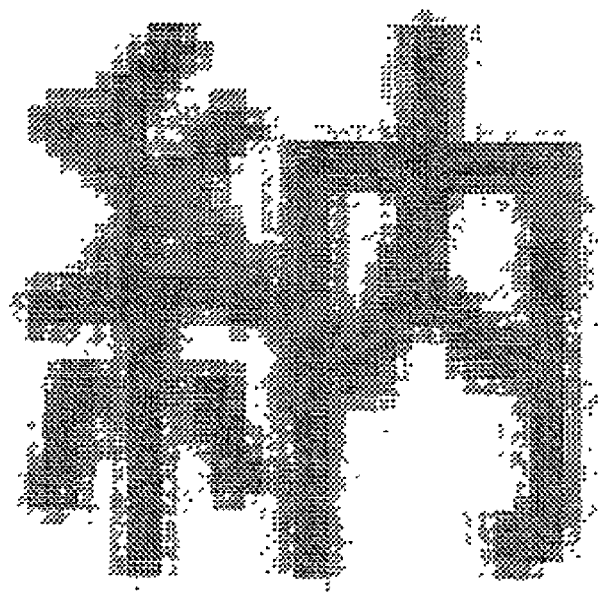
FIG. 2 shows the state of a grayscale scanner image.
Figure 3:
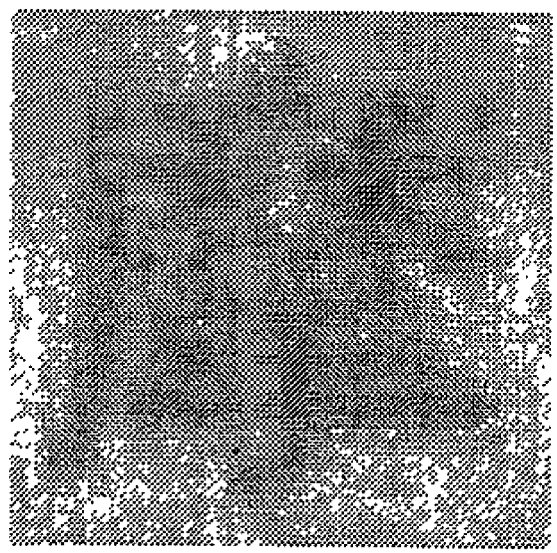
FIG. 3 shows the state of a grayscale OHR image.
Figure 4:
FIG. 4 shows the state of an OHR image with a shadow.
Figure 5:
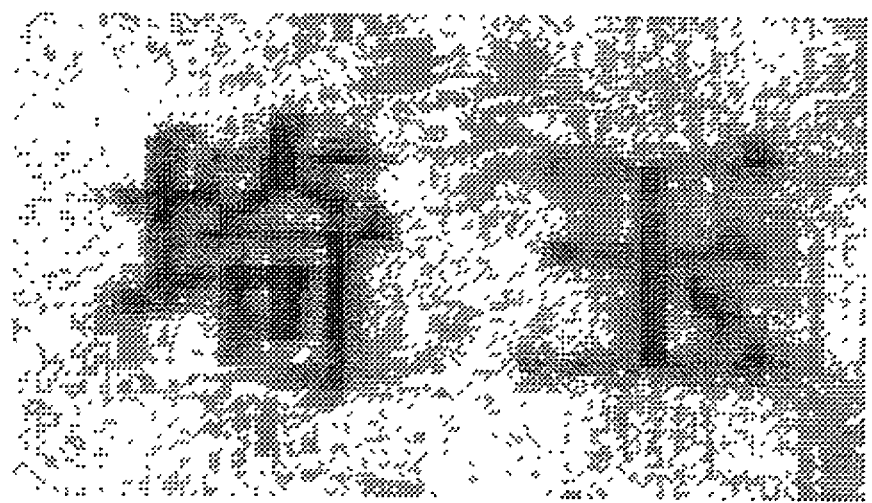
FIG. 5 exemplifies an OHR image.
Figure 6:
FIG. 6 shows a binary image obtained by performing Niblack local binarization for an OHR image.
Figure 7A:
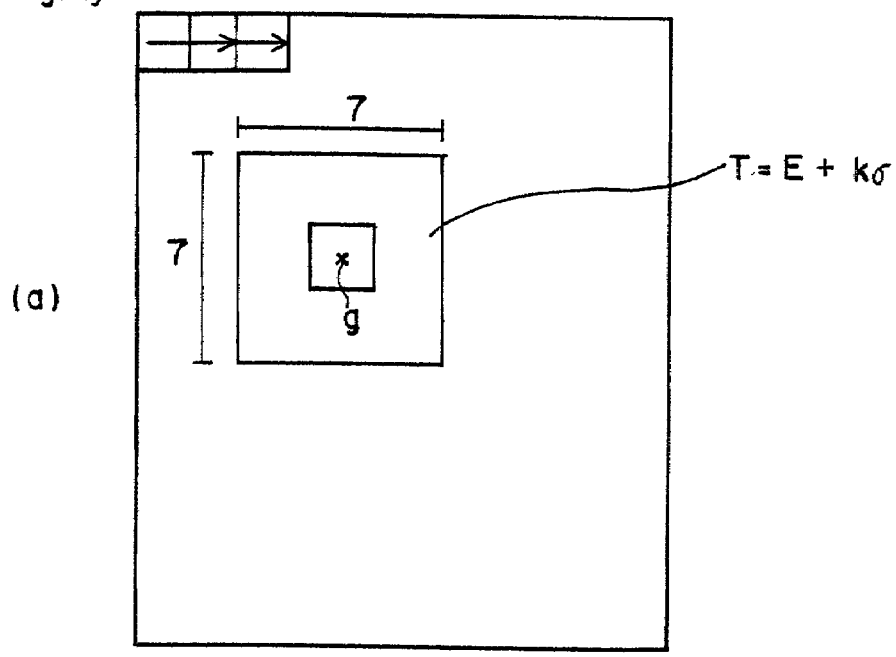
FIGS. 7A and 7B explain the concept of Niblack local binarization.
Figure 7B:
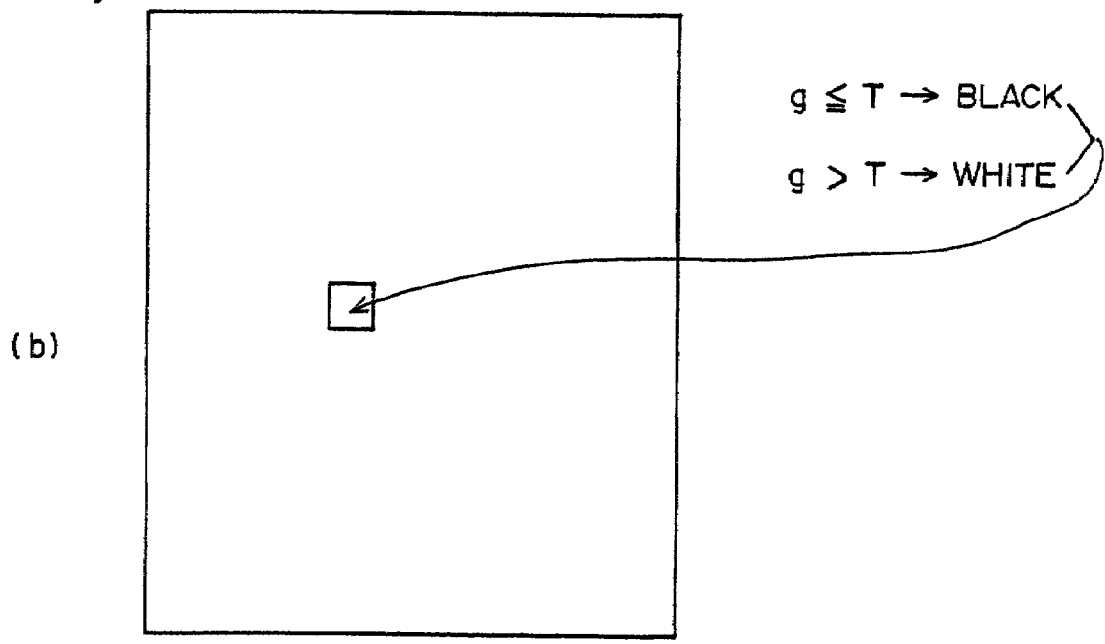
Figure 8:
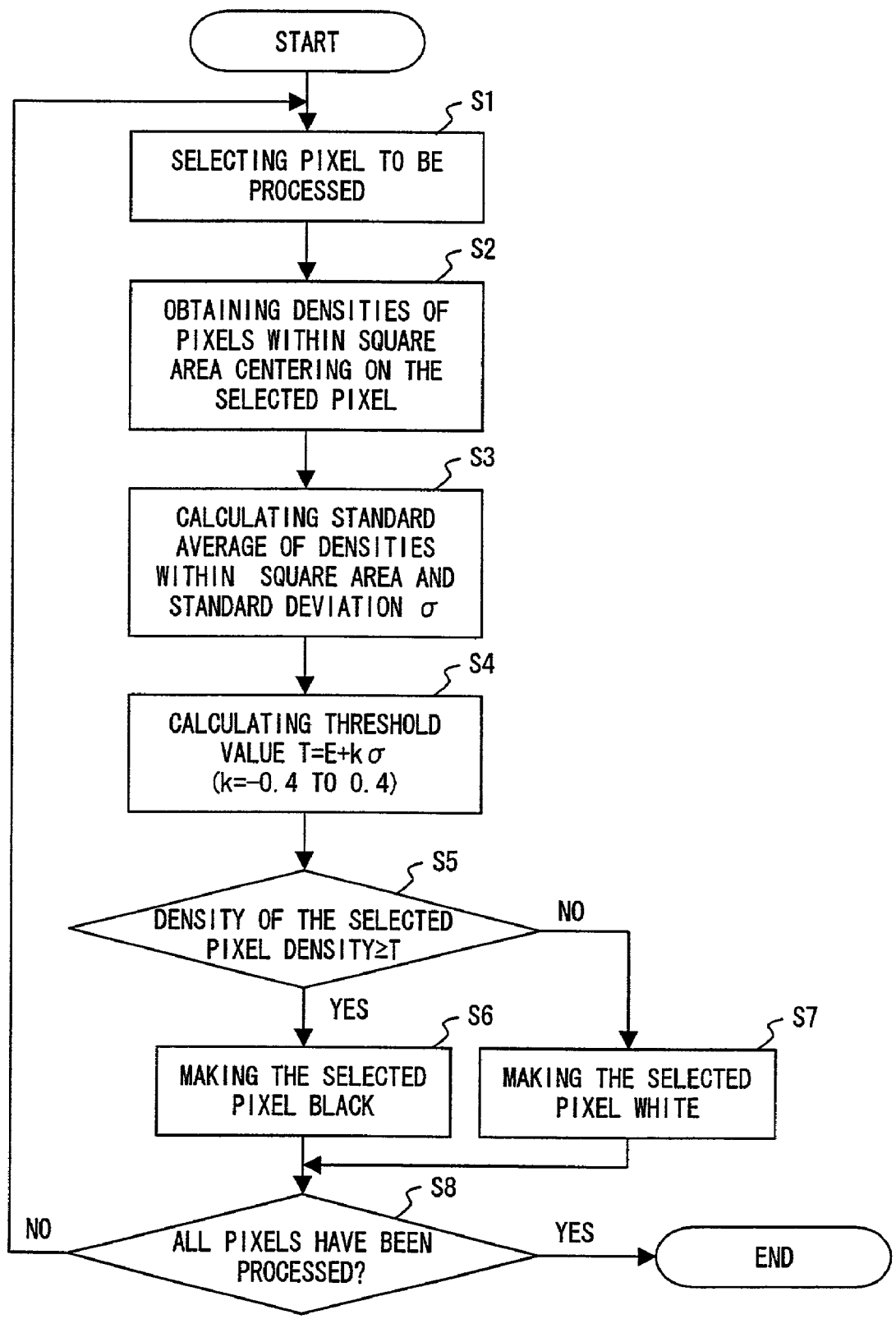
FIG. 8 is a flowchart showing the flow of the Niblack local binarization process.
Figure 9:
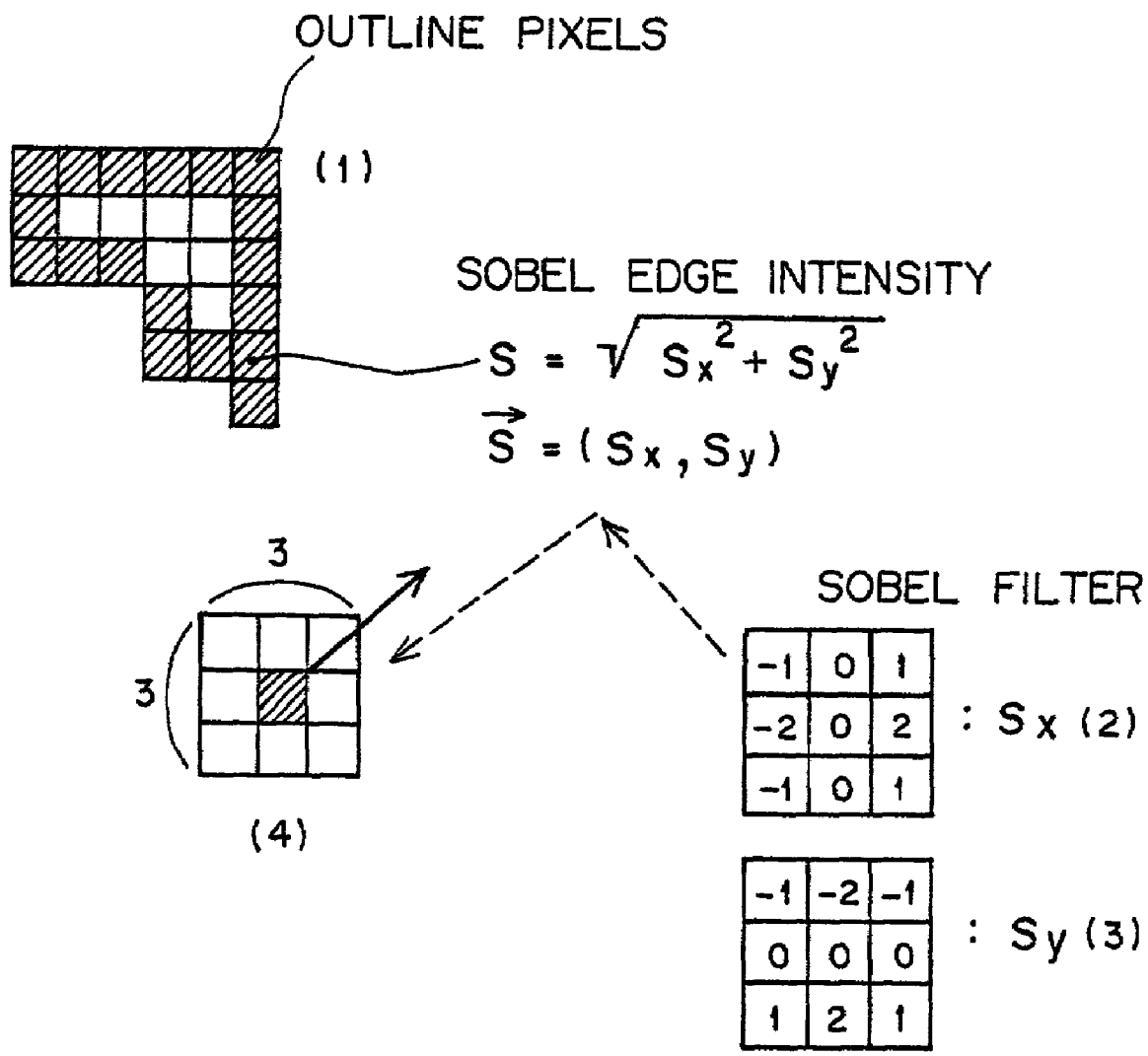
FIG. 9 explains a Sobel edge filter and edge intensity.
Figure 10:
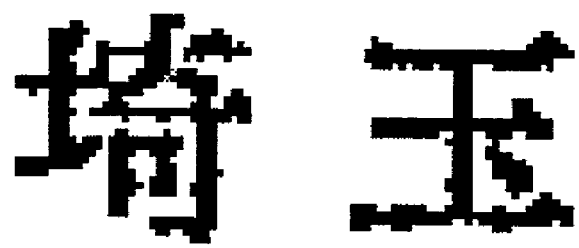
FIG. 10 shows a result of eliminating background noise by removing 4-concatenated components whose average edge intensities are equal to or smaller than 4.
Figure 11:
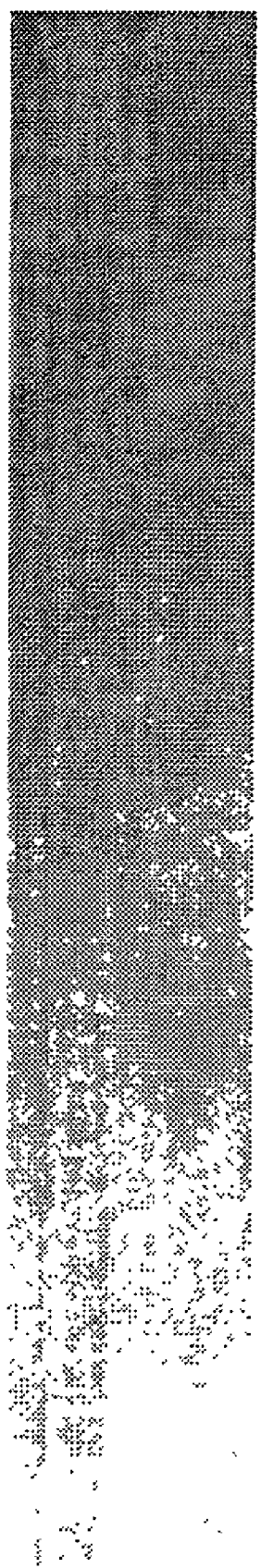
FIG. 11 exemplifies a grayscale image including an extremely faint character string.
Figure 12:
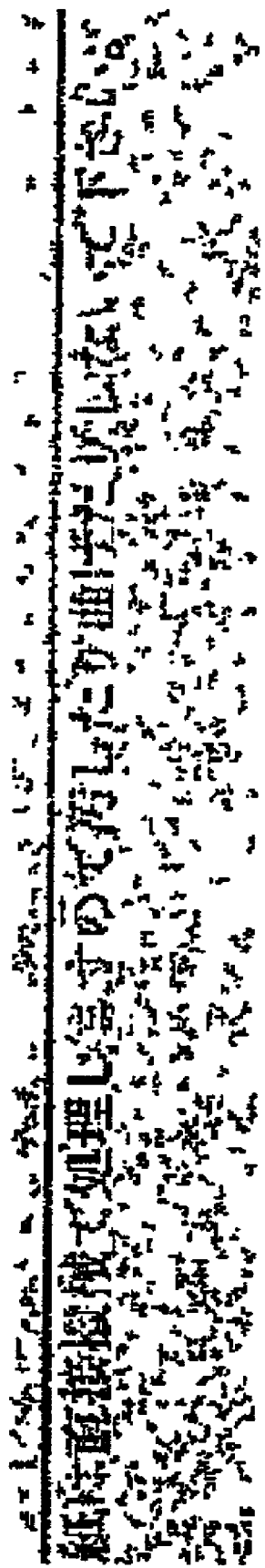
FIG. 12 shows the state where Niblack local binarization is performed without noise elimination.
Figure 13:
FIG. 13 shows a binary image obtained by performing, for the image of FIG. 11, Niblack local binaization with which pixels whose average edge intensities are 4.0 or smaller are removed.
Figure 14:
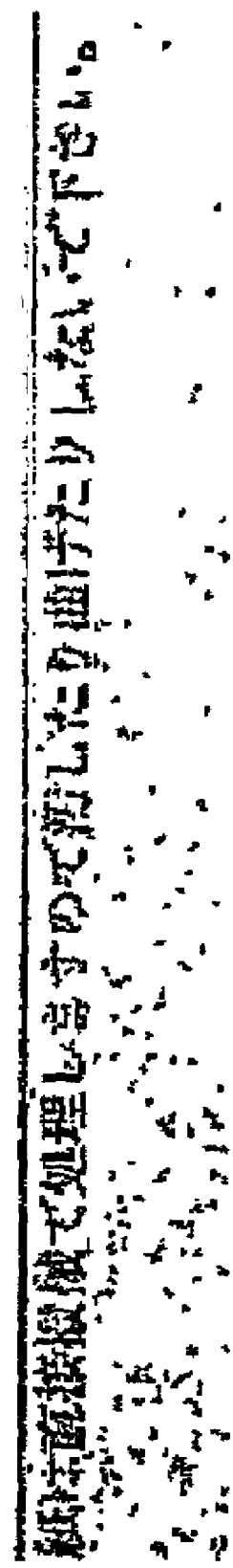
FIG. 14 shows a binary image obtained by performing, for the image of FIG. 11, Niblack local binarization with which pixels whose average edge intensities are 2.0 or smaller are removed.

FIG. 16 shows a slightly indistinct binary image obtained from the grayscale image that is shown in FIG. 11 and includes the extremely faint character string.

This binary image includes almost the entire line patterns although their shapes are indistinct, and does not include the noise in the background area.

Figure 17:
FIG. 17 shows a shape-preserved binary image obtained from the grayscale image that is shown in FIG. 11 and includes the extremely faint character string shown in FIG. 11.

FIG. 17 shows a shape-preserved binary image obtained from the grayscale image that is shown in FIG. 11 and includes the extremely faint character string.

This binary image includes almost the entire line patterns while preserving their shapes, and also includes the noise in the background area other than the neighborhood of the line patterns.

Figure 18:
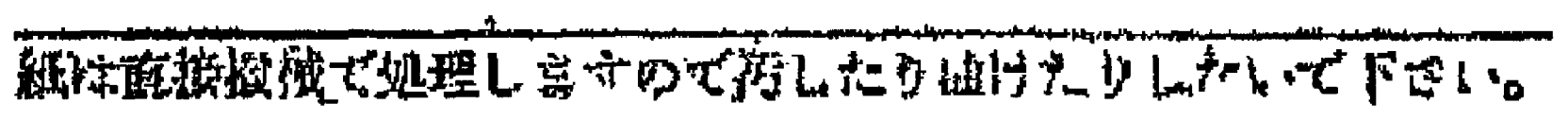

FIG. 18 shows a combined binary image obtained by ANDing the slightly indistinct binary image and the shape-preserved binary image for each pixel. This binary image is a satisfactory binary image that includes almost the entire line patterns while preserving their shapes and does not include the noise in the background area. It is proved from this preferred embodiment that an extremely faint character string can be satisfactorily extracted.

In the above described and the following preferred embodiments, a slightly indistinct binary image is obtained by setting the value of σ to a large positive value, whereas a shape-preserved binary image is obtained by setting the value of σ to a negative or a small value in the Niblack local binarization process.

Accordingly, the algorithms of the processes performed by the slightly indistinct binary image generating unit 10 and the shape-preserved binary image generating unit 11, which are shown in FIG. 15, are the same Niblack local binarization process, and only difference exists between binarization threshold values in these algorithms.

FIG. 19 exemplifies a second configuration of an image processing apparatus according to a preferred embodiment of the present invention.

The image processing apparatus having this exemplified configuration, to which a multilevel image including a line pattern such as a character, a ruled line, a graphic, etc. is input, comprises a slightly indistinct binary image generating unit 10a, a shape-preserved binary image generating unit 11a, and a binary image combining unit 12. When a binary image obtained by extracting a line pattern as black pixels is output, the slightly indistinct binary image generating unit 10a generates a slightly indistinct binary image that includes almost an entire line pattern although its shape is indistinct, and does not include noise in a background area; the shape-preserved binary image generating unit 11a generates an image that includes almost the entire line pattern while preserving its shape, and also includes noise in a background area other than the neighborhood of the line pattern; and the binary image combining unit 12 combines the slightly indistinct binary image and the shape-preserved binary image. As a result, a satisfactory binary image that includes almost the entire line pattern while preserving its shape, and does not include the noise in the background area is generated and output.

The slightly indistinct binary image generating unit 10a comprises a slightly indistinct binarizing unit 13 and a background noise eliminating unit 15. The slightly indistinct binarizing unit 13 generates from an input multilevel image a slightly indistinct binary image with background noise, which includes almost an entire line pattern although its shape is indistinct and also includes noise in a background area, and the background noise eliminating unit 15 generates a slightly indistinct binary image that does not include the background noise from the slightly indistinct binary image with background noise. The shape-preserved binary image generating unit 11a comprises a shape-preserved binarizing unit 14, and a background noise eliminating unit 15. The shape-preserved binarizing unit 14 generates from an input multilevel image a shape-preserved binary image with neighboring noise, which includes almost an entire line pattern while preserving its shape and also includes noise in a background area containing the neighborhood of the line pattern. The background noise eliminating unit 15 generates a shape-preserved binary image, which includes almost the entire line pattern while preserving its shape and also includes the noise in the background area containing the neighborhood of the line pattern, by eliminating the background noise from the shape-preserved binary image with neighboring noise.

Note that the same algorithm of the background noise eliminating unit 15 is applicable to both the slightly indistinct binary image generating unit 10a and the shape-preserved binary image generating unit. A specific background noise elimination method will be described later.

Figure 20:
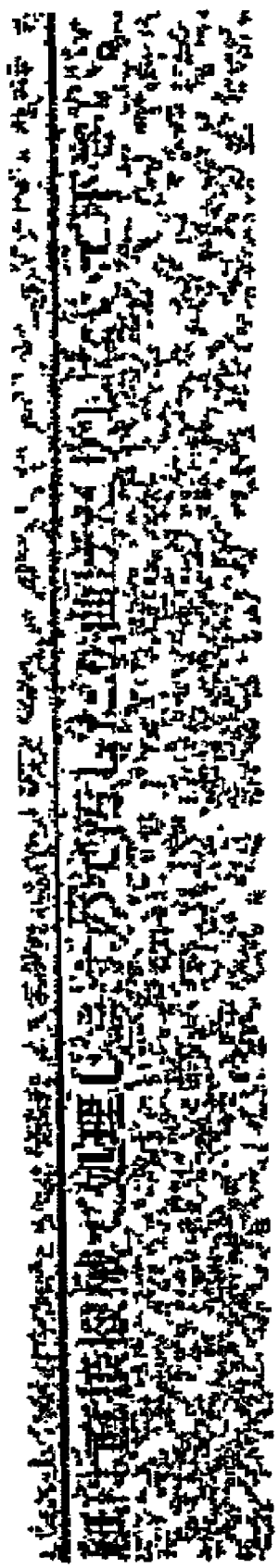
FIG. 20 shows a slightly indistinct binary image with background noise, which is obtained from the grayscale image that is shown in FIG. 11 and includes the extremely faint character string.

FIG. 20 shows a slightly indistinct binary image with background noise, which is obtained from the grayscale image that is shown in FIG. 11 and includes the extremely faint character string.

This binary image includes almost the entire line patterns although their shapes are indistinct, and also includes the noise in the background area.

Figure 21:
FIG. 21 shows a slightly indistinct binary image obtained from the grayscale image that is shown in FIG. 11 and includes the extremely faint character string.

FIG. 21 shows a slightly indistinct binary image obtained from the grayscale image that is shown in FIG. 11 and includes the extremely faint character string.

This binary image has a nature such that almost the entire line patterns are included although their shapes are indistinct, and the noise in the background area is not included. The reason why such a binary image can be generated is that a distribution of the number of black pixels to an average edge intensity of black pixel concatenated components including the line patterns of a slightly indistinct binary image with background noise is separate from a distribution of concatenated components including only the background noise of the image.

Figure 22:
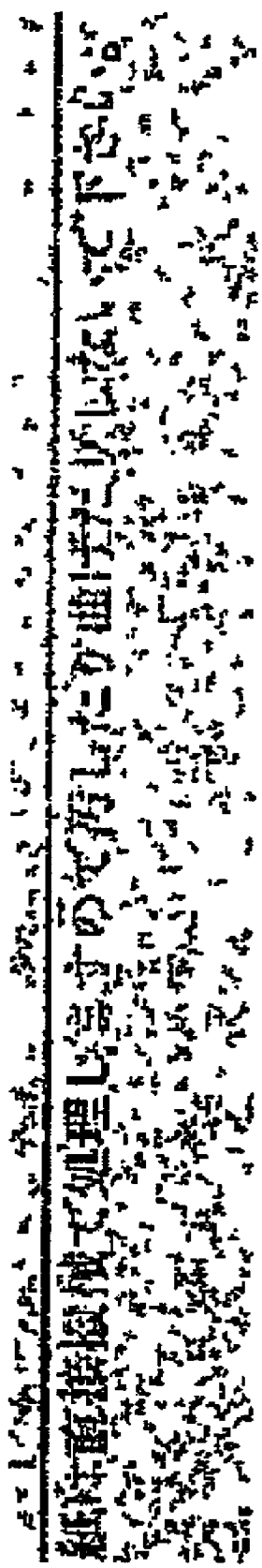
FIG. 22 shows a shape-preserved binary image with neighboring noise, which is obtained from the grayscale image that is shown in FIG. 11 and includes the extremely faint character string.

FIG. 22 shows a shape-preserved binary image with neighboring noise, which is obtained from the grayscale image that is shown in FIG. 11 and includes the extremely faint character string.

This binary image includes almost the entire line patterns while preserving their shapes, and also includes the noise in the background containing the neighborhood of the line patterns.

Figure 23:
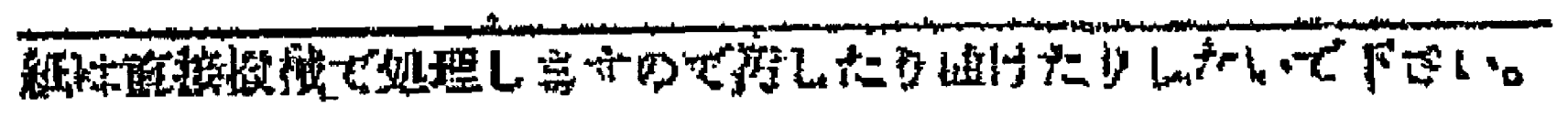

FIG. 23 shows a shape-preserved binary image obtained from the grayscale image that is shown in FIG. 11 and includes the extremely faint character string.

This binary image has a nature such that almost the entire line patterns are included while their shapes are preserved, and also noise in a background area other than the neighborhood of the line patterns is included. The reason why also the noise in the background area is included is that a distribution of the number of black pixels to an average edge intensity of the black pixel concatenated components including the line patterns of the shape-preserved binary image with neighboring noise is not separate from a distribution of concatenated components including only the background noise. As a result, the background noise in the area where the distributions overlap cannot be eliminated, when the background noise is eliminated while preventing the line patterns from being erroneously eliminated.

Figure 24:
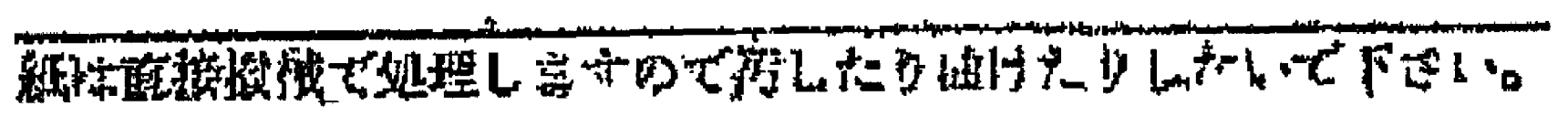

FIG. 24 shows a combined binary image obtained by ANDing the slightly indistinct binary image and the shape-preserved binary image for each pixel.

This binary image is a satisfactory binary image that includes almost the entire line patterns while preserving their shapes, and does not include the noise in the background area. It is proved from this preferred embodiment that an extremely faint character string can be satisfactorily extracted.

Any of the above described configurations utilizes a nature such that a distribution of the number of black pixels to an average edge intensity of concatenated components including line patterns is separate from that of concatenated components of background noise as shown in the graphs that represent the number of black pixels to an average edge intensity for line patterns and are shown in FIGS. 25A and 25B, if a comparison is made for a binary image resultant from the local binarization between a distribution of a shape-preserved binary image (FIG. 25A) and that of a slightly indistinct binary image (FIG. 25B) by changing the binarization threshold value.

A slightly indistinct binary image that includes almost the entire line patterns although their shapes are indistinct and does include the noise in the background area, and a shape-preserved binary image that includes almost the entire line patterns while preserving their shapes and also includes noise in a background area other than the neighborhood of the line patterns are generated, and the generated binary images are ANDed, whereby a satisfactory binary image that includes almost the entire line patterns while preserving their shapes and does not include the noise in the background area is generated.

This preferred embodiment allows an extremely faint character string to be satisfactorily extracted without including background noise, which cannot be implemented with the conventional techniques, as shown in FIG. 18 or 24 by effectively using a change in the characteristic distributions of concatenated components shown in FIGS. 25A and 25B, and overcomes the problems caused by the conventional techniques.

FIG. 26 exemplifies a more specific configuration of the preferred embodiment according to the present invention.

The image processing apparatus shown in FIG. 26, to which a multilevel image including a line pattern such as a character, a ruled line, a graphic, etc. is input, comprises a slightly indistinct binary image generating unit 10a, a shape-preserved binary image generating unit 11a, and a binary image combining unit 12. This apparatus outputs a binary image obtained by extracting a line pattern as black pixels. The slightly indistinct binary image generating unit 10a generates a slightly indistinct binary image that includes almost an entire line pattern although its shape is indistinct, and does not include noise in a background area; the shape-preserved binary image generating unit 11a generates a shape-preserved binary image that includes almost the entire line pattern while preserving its shape, and also includes noise in a background area other than the neighborhood of the line pattern; and the binary image combining unit 12 combines the slightly indistinct binary image and the shape-preserved binary image. As a result, a satisfactory binary image that includes almost the entire line pattern while preserving its shape and does not include the noise in the background area is generated and output.

The slightly indistinct binary image generating unit 10a comprises a slightly indistinct binarizing unit 13 and a background noise eliminating unit 15. The slightly indistinct binarizing unit 13 obtains a binary image with Niblack local binarization by defining that an average of densities of pixels in an area of 7×7 pixels centering on a target pixel is E, and a standard deviation is σ, and by setting $T=E+0.3\sigma$ as a binarization threshold value for each pixel. If the value of k in the equation $T=E+k\sigma$ is a large value of approximately 0.3, a slightly indistinct binary image with background noise, which includes almost an entire line pattern although its shape is indistinct and also includes noise in a background area, can be generated from an input multilevel image.

The shape-preserved binary image generating unit 11a comprises a shape-preserved binarizing unit 14, and a background noise eliminating unit 15. The shape-preserved binarizing unit 14 obtains a binary image with Niblack local binarization by defining that an average of densities of pixels in an area of 7×7 pixels centering on a target pixel is E, and a standard deviation is σ, and by setting $T=E+0.1\sigma$ as a binarization threshold value for each pixel. If the value of k in the equation $T=E+k\sigma$ is a small value of approximately 0.1, a shape-preserved binary image with neighboring noise, which includes almost an entire line pattern while preserving its shape and also includes noise in a background area other than the neighborhood of the line pattern, can be generated from an input multilevel image.

The background noise eliminating unit 15 generates a binary image from the slightly indistinct binary image with background noise and the shape-preserved binary image with neighboring noise by eliminating the background noise.

In this preferred embodiment, the background noise eliminating unit is implemented by the following method explained with a graph.

Figure 27:
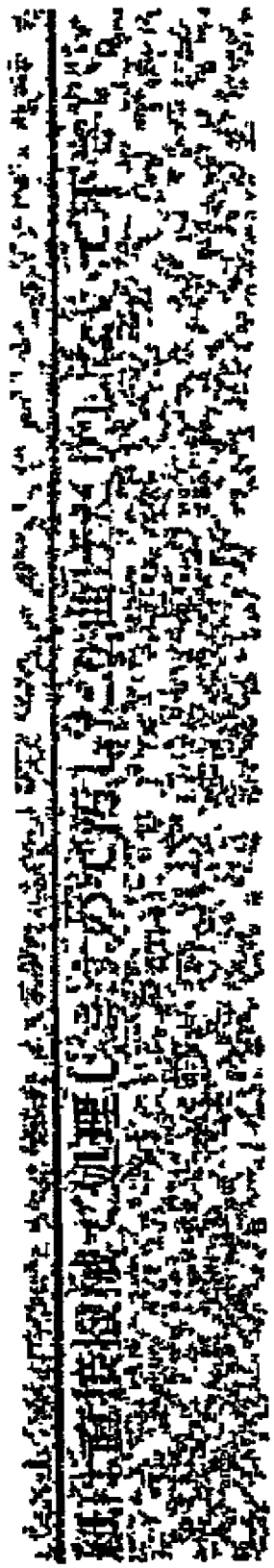
FIG. 27 shows a slightly indistinct binary image with background noise, which is obtained from the grayscale image that is sown in FIG. 11 and includes the extremely faint character string.

FIG. 27 shows a slightly indistinct binary image with background noise, which is obtained from the grayscale image that is shown in FIG. 11 and includes the extremely faint character string.

This binary image includes almost the entire line patterns although their shapes are indistinct and also includes the noise in the background area.

Figure 28:
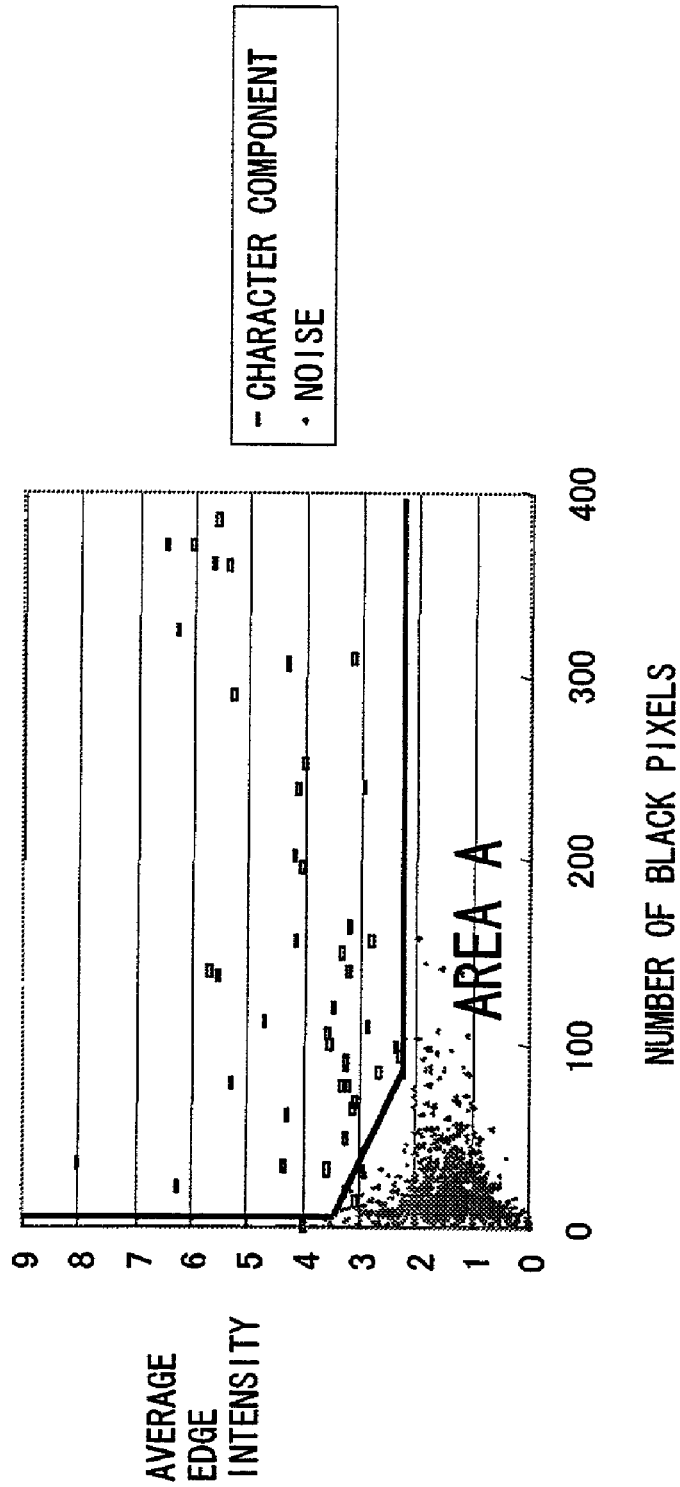
FIG. 28 is a graph representing a characteristic amount of 4-concatenated components of a slightly indistinct binary image with background noise, that is, a distribution of the number of black pixels to an average edge intensity of concatenated components.

FIG. 28 is a graph representing a characteristic amount of 4-concatenated components of a slightly indistinct binary image with background noise, that is, a distribution of the number of black pixels of concatenated components to the average edge intensity of outline pixels. A distribution of concatenated components of background noise is clearly separate from that of concatenated components including line patterns. The reason is that the background noise in the neighborhood of the line patterns is concatenated with the line patterns, since the image is made indistinct. Accordingly, the background noise eliminating unit removes the concatenated components belonging to an area A, so that only the concatenated components including the line patterns can be extracted. A condition of belonging to the area A in this preferred embodiment is that the number of black pixels is equal to or smaller than 13, or an average edge intensity is equal to or smaller than 2.2, or the average edge intensity is equal to or smaller than (3.2−(the number of black pixels−15)/65).

The background noise eliminating unit eliminates the background noise from the slightly indistinct binary image with background noise by using the condition to be satisfied for belonging to the area A, so that the slightly indistinct binary image that includes almost the entire line patterns although their shapes are indistinct and does not include the noise in the background area can be generated.

FIG. 29 shows a slightly indistinct binary image obtained from the grayscale image that is shown in FIG. 11 and includes the extremely faint character string.

This binary image has a nature such that almost the entire line patterns are included although their shapes are indistinct, and the noise in the background area is not included. The reason why such a binary image can be generated is that a characteristic amount of the number of black pixels to the average edge intensity of black pixel concatenated components including the line patterns of a slightly indistinct binary image with background noise is separate from a distribution of the number of black pixels to the average edge intensity of concatenated components including only the background noise.

The shape-preserved binary image generating unit comprises a shape-preserved binarizing unit, and a background noise eliminating unit. The shape-preserved binarizing unit obtains a binary image with Niblack local binarization by defining that an average of densities of pixels within an area of 7×7 pixels centering on a target pixel is E, and a standard deviation is σ, and by setting $T=E+0.1\sigma$ as a binarization threshold value for each pixel. If the value of k in the equation $T=E+k\sigma$ is a small value of approximately 0.1, a shape-preserved binary image with neighboring noise, which includes almost an entire line pattern while preserving its shape and also includes noise in a background area containing also the neighborhood of the line pattern, can be generated from an input multilevel image.

Figure 30:
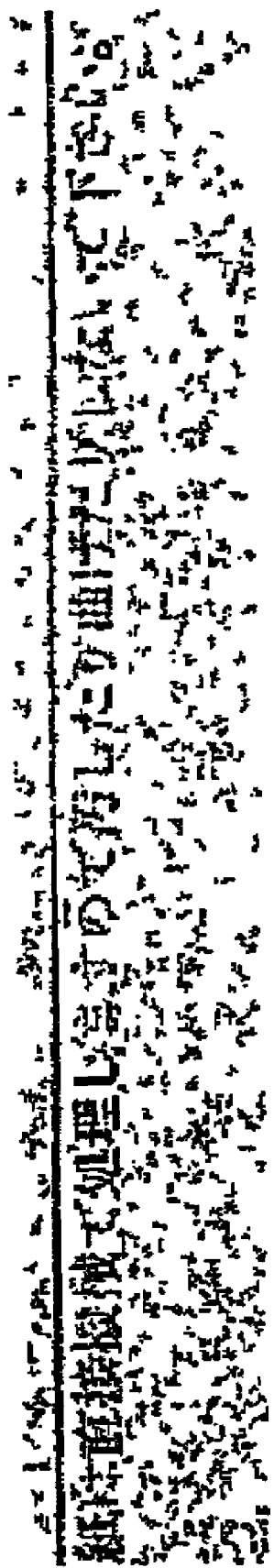
FIG. 30 shows a shape-preserved binary image with neighboring noise, which is obtained from the grayscale image that is shown in FIG. 11 and includes the extremely faint character string.

FIG. 30 shows a shape-preserved binary image with neighboring noise, which is obtained from the grayscale image that is shown in FIG. 11 and includes the extremely faint character string.

This binary image includes almost the entire line patterns while preserving their shapes, and also includes the noise in the background area other than the neighborhood of the line patterns.

Figure 31:
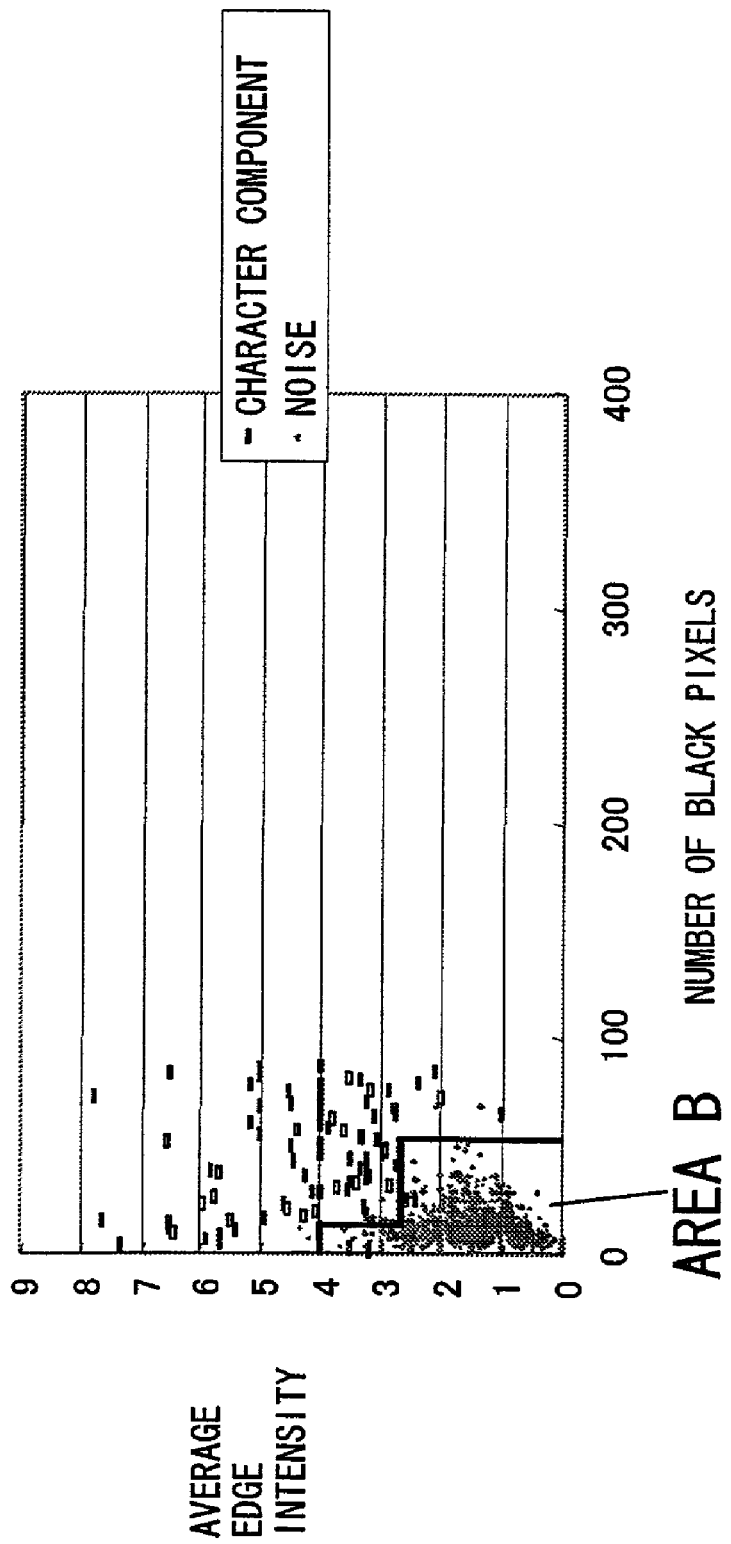
FIG. 31 is a graph representing a characteristic amount of 4-concatenated components of a shape-preserved binary image with neighboring noise, that is, a distribution of the number of black pixels to an average edge intensity of concatenated components.

FIG. 31 is a graph representing a characteristic amount of 4-concatenated components of a shape-preserved binary image with neighboring noise, that is, a distribution of the number of black pixels of the concatenated components to the average edge intensity of outline pixels.

A distribution of concatenated components of background noise and that of concatenated components including the line patterns overlap. The reason is that the background noise in the neighborhood of the line patterns is not concatenated with the line patterns, since the image is not indistinct. Therefore, the background noise eliminating unit removes the concatenated components belonging to an area B, so that a shape-preserved binary image that includes almost the entire line patterns while preserving their shapes and also includes the noise in the background area other than the neighborhood of the line patterns can be generated. A condition of belonging to the area B in this preferred embodiment is that the number of black pixels is equal to or smaller than 12 and the average edge intensity is equal to or smaller than 4, or the number of black pixels is equal to or smaller than 60 and the average edge intensity is equal to or smaller than 2.8.

The background noise eliminating unit eliminates the background noise from the shape-preserved binary image with neighboring noise by using the above described condition to be satisfied for belonging to the area B, so that a shape-preserved binary image that includes almost the entire line patterns while preserving their shapes and also includes the noise in the background area other than the neighborhood of the line patterns can be generated.

Figure 32:
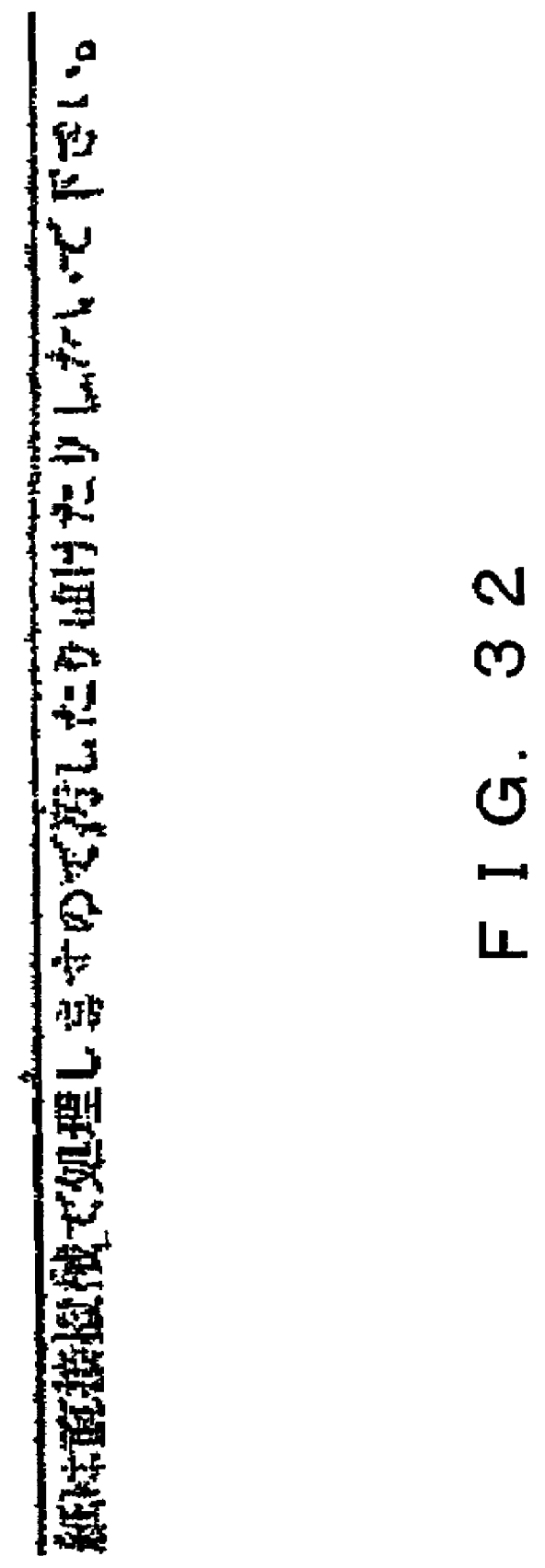

FIG. 32 shows a shape-preserved binary image obtained from the grayscale image that is shown in FIG. 11 and includes the extremely faint character string.

This binary image has a nature such that almost the entire line patterns are included while their shapes are preserved, and also the noise in the background area other than the neighborhood of the line patterns is included. The reason why the noise in the background is included is that the background noise in the area where distributions of the number of black pixels to the average edge intensity of concatenated components including the line patterns and the background noise overlap cannot be eliminated, when the concatenated components of the background noise are removed from the shape-preserved binary image with neighboring noise.

FIG. 33 shows a combined binary image obtained by ANDing the slightly indistinct binary image and the shape-preserved binary image for each pixel.

This binary image is a satisfactory binary image that includes almost the entire line patterns while preserving their shapes and does not include the noise in the background area. It is proved from this preferred embodiment that an extremely faint character string can be satisfactorily extracted.

A slightly indistinct binary image that includes almost the entire line patterns although their shapes are indistinct and does not include the noise in the background area, and a shape-preserved binary image that includes almost the entire line patterns while preserving their shapes and also includes the noise in the background area other than the neighborhood of the line patterns are generated by using a nature such that a distribution of the number of black pixels to the average edge intensity of concatenated components including the line patterns, and that of concatenated components of the background noise overlap regarding a binary image resultant from the local binarization, in which the shapes of the line patterns are preserved, whereas the distribution of the number of black pixels to the average edge intensity of concatenated components including the line patterns is separate from that of concatenated components of the background noise regarding a binary image resultant from the local binarization, in which the shapes of the line patterns are made indistinct. The generated binary images are ANDed for each pixel, so that a satisfactory binary image that includes almost the entire line patterns while preserving their shapes and does not include the noise in the background area is generated.

FIG. 34 is a flowchart showing the above described background noise elimination process.

Firstly, in step S10, the number of black pixels and the average edge intensity of each of concatenated components are obtained. Then, in step S11, the number of black pixels and the average edge intensity of one of the concatenated components are selected as a concatenated component to be processed. In step S12, it is determined whether or not the number of black pixels is within a predetermined range. If the result of the determination is "NO", the process goes to step S15. If the result of the determination is "YES", it is further determined whether or not the average edge intensity is within a predetermined range in step S13. If the result of the determination is "NO" in step S13, the process goes to step S15. If the result of the determination is "YES" in step S13, the concatenated component to be processed is removed in step S14. The process then goes to step S15. In step S15, it is determined whether or not all the concatenated components have been processed. If a concatenated component yet to be processed is left, the process goes back to step S11. If it is determined that all the concatenated components have been processed, the process is terminated.

The above described example refers to the method introduced by the preferred embodiments according to the present invention as the background noise elimination. However, other methods such as the Yanowitz and Bruckstein's method, etc. are available. Or, for example, the method recited by Japanese Patent Application NO. 11-335495, which is a previous application of the present applicant, may be available. This application recites, as a background determination method, a method with which a target pixel is determined to be background if a standard deviation $\sigma$ of the densities of pixels within a neighboring area of the target pixel is smaller than a threshold value $\sigma$min, or a target pixel is determined to be background if an average density difference $\Delta g$ is smaller than a predetermined threshold value $\Delta g$min when the average density difference $\Delta g=\{$an average density of white pixels within a neighboring area—an average density of black pixels within the neighboring area$\}$ is defined. With this method, a pixel determined to be background is corrected to be white, so that spotted black-and-white noise is eliminated. Here, the average density difference is a difference between the average densities of the sets of white and black pixels in the case where neighboring pixels of a target pixel are tentatively binarized with the binarization threshold value of the target pixel.

Additionally, as in the above described preferred embodiment, postprocessing may be further performed for an image to reduce noise after a slightly indistinct binary image and a shape-preserved binary image are ANDed. Namely, the background noise eliminating unit 15 shown in FIG. 26 determines a concatenated component to be eliminated as background noise by judging whether or not the concatenated component is within a predetermined range specified by the number of black pixels and an average edge intensity, as shown in the graphs of FIGS. 28 and 31. However, this is not sufficient for all cases. That is, background noise can possibly remain even after the AND process.

Therefore, as described above, the method recited by Japanese Patent Application No. 11-225495, or the Yanowitz and Bruckstein's postprocessing, which is also available as the background noise eliminating unit, is performed for a binary image after being ANDed. Especially, the Yanowitz and Bruckstein's postprocessing is described as the Postprocessing step in the above described paper.

As described above, a binary image of higher quality can be obtained by using the method of the previous application or the Yanowitz and Bruckstein's postprocessing in combination with the improvement in the quality of a binary image, which is implemented by the AND process of the preferred embodiments.

FIG. 35 shows the configuration of an information processing device required when any of the preferred embodiments according to the present invention is implemented by a program.

In the information processing device, a CPU 21 copies a program into a memory 22 via an external storage device 25 such as a hard disk, etc., or a medium driving device 26 reading a portable storage medium 29 (e.g., CD-ROM, floppy disk, DVD, etc.), which is connected by a bus 28, and executes the program.

An input device 23 is configured by a keyboard, a mouse, a tablet, an OHR, etc., which a user of the information processing device utilizes to issue a command to the CPU 21, or to capture an image. For example, it is also possible to set the value of σ in the Niblack binarization process, or to specify the range of the number of black pixels or an average edge intensity in the background noise elimination process. An output device 24 is configured by a display, a printer, etc., and is used to present a process result to a user, or to print a binary image.

A network connecting device 27 is arranged to exchange data via a network, and can be used to read an image from an OHR apart from the information processing device, or to download a program for executing the processes of the preferred embodiments.

Figure 36:
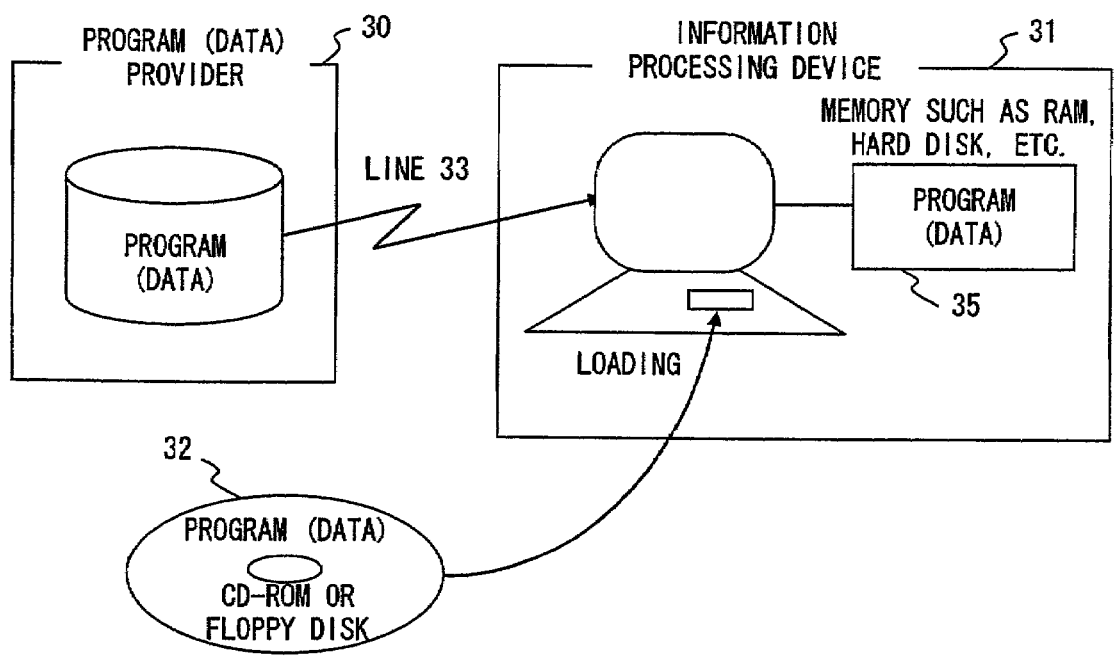
FIG. 36 explains a usage pattern of program data.

FIG. 36 explains a usage pattern of program data.

A program according to the preferred embodiments is stored in a memory 35 such as a RAM, a hard disk, etc. of an information processing device 31, and used. However, the program stored onto a CD-ROM, a floppy disk 32, etc. maybe loaded and used. Otherwise, program data may be downloaded from a program provider 30 via a line 33, and used in the information processing device 31. Or, the program possessed by the program provider 30 may be executed under a network environment without being downloaded.

As described above, according to the present invention, a change in characteristic distributions of concatenated components is effectively used, whereby an extremely faint character string within a multilevel image can be extracted without including background noise.

What is claimed is:

1. An image processing apparatus, to which an image including a line pattern input, outputting a corresponding binary image, comprising:
    a slightly indistinct binary image generating unit generating a first image that includes almost an entire shape of a line pattern although the shape is indistinct;
    a shape-preserved binary image generating unit generating a second image that includes almost the entire shape of the line pattern and also includes noise in a background area other than a neighborhood of the line pattern; and
    an image combining unit performing AND operation between the first and second images, and generating a satisfactory binary image that includes almost the entire shape of the line pattern while preserving the shape and does not include the noise in the background area.

2. The image processing apparatus according to claim 1, further comprising
    a background noise eliminating unit eliminating the noise in the background area from the first and the second images.

3. An image processing apparatus, to which an image including a line pattern is input, outputting a corresponding binary image, comprising:
    a slightly indistinct binary image generating unit generating a first image that includes almost an entire shape of a line pattern although the shape is indistinct;
    a shape-preserved binary image generating unit generating a second image that includes almost the entire shape of the line pattern and also includes noise in a background area other than a neighborhood of the line pattern;
    an image combining unit combining the first and second images for each pixel, and generating a satisfactory binary image that includes almost the entire shape of the line pattern while preserving the shape and does not include the noise in the background area, and
    a background noise eliminating unit eliminating the noise in the background area from the first and the second images; and said background noise eliminating unit eliminates the background noise by classifying concatenated components into a concatenated component including a line pattern and a concatenated component being background noise based on distributions of the number of black pixels to an average edge intensity of 4- or 8-concatenated. components of black pixels of a binary image being an input first or second image, and by removing a concatenated component determined to be the background noise.

4. An image processing apparatus, to which an image including a line pattern is input, outputting a corresponding binary image, comprising:
    a slightly indistinct binary image generating unit generating a first image that includes almost an entire shape of a line pattern although the shape is indistinct;
    a shape-preserved binary image generating unit generating a second image that includes almost the entire shape of the line pattern and also includes noise in a background area other than a neighborhood of the line pattern;
    an image combining unit combining the first and second images for each pixel, and generating a satisfactory binary image that includes almost the entire shape of the line pattern while preserving the shape and does not include the noise in the background area, and
    a background noise eliminating unit eliminating the noise in the background area from the first and the second images; and said background noise eliminating unit determines a certain pixel to be a background pixel if a standard deviation or an average density difference of densities of neighboring pixels of the certain pixel of an input first or second image is within a predetermined range.

5. The image processing apparatus according to claim 1, wherein
the first and the second images are generated by performing the Niblack local binarization method for an input image.

6. The image processing apparatus according to claim 1, wherein
the Yanowitz and Bruckstein's postprocessing is performed for an output of said image combining unit.

7. An image processing method inputting an image including a line pattern, and outputting a corresponding binary image, comprising:
generating a first image that includes almost an entire shape of a line pattern although the shape is indistinct;
generating a second image that includes almost the entire shape of the line pattern and also includes noise in a background area other than a neighborhood of the line pattern; and
performing AND operation between the first and second images, and generating a satisfactory binary image that includes almost the entire shape of the line pattern while preserving the shape, and does not include the noise in the background area.

8. A program for causing an information processing device to execute an image processing method inputting an image including a line pattern, and outputting a corresponding binary image, the method comprising:
generating a first image that includes almost an entire shape of a line pattern although the shape is indistinct;
generating a second image that includes almost the entire shape of the line pattern and also includes noise in a background area other than a neighborhood of the line pattern; and
performing AND operation between the first and second images, and generating a satisfactory binary image that includes almost the entire shape of the line pattern while preserving the shape, and does not include the noise in the background area.

9. A storage medium readable by an information processing device, on which is recorded a program for causing the information processing device to execute an image processing method inputting an image including a line pattern, and outputting a corresponding binary image, the method comprising:
generating a first image that includes almost an entire shape of a line pattern although the shape is indistinct;
generating a second image that includes almost the entire shape of the line pattern and also includes noise in a background area other than a neighborhood of the line pattern; and
performing AND operation between the first and second images, and generating a satisfactory binary image that includes almost the entire shape of the line pattern while preserving the shape, and does not include the noise in the background area.

* * * * *